May 19, 1953

M. E. KING 2,638,795

DIFFERENTIAL DRIVE MECHANISM

Filed Feb. 6, 1951

2 Sheets-Sheet 1

INVENTOR
Manley E. King
BY Walter P. Guyer
ATTORNEY

May 19, 1953 M. E. KING 2,638,795
DIFFERENTIAL DRIVE MECHANISM
Filed Feb. 6, 1951 2 Sheets-Sheet 2
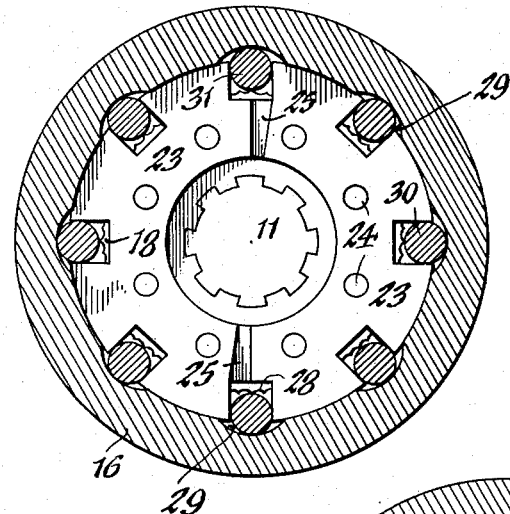
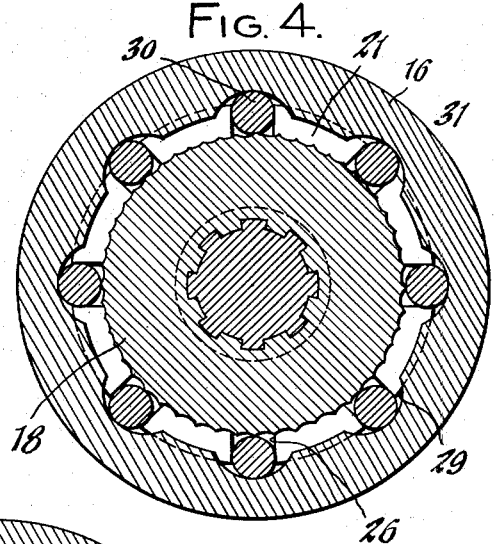
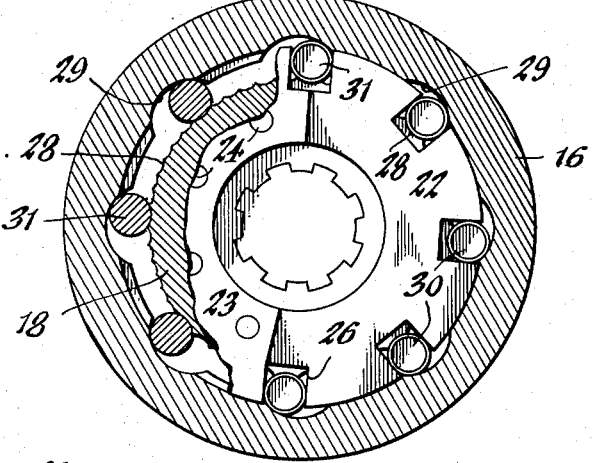
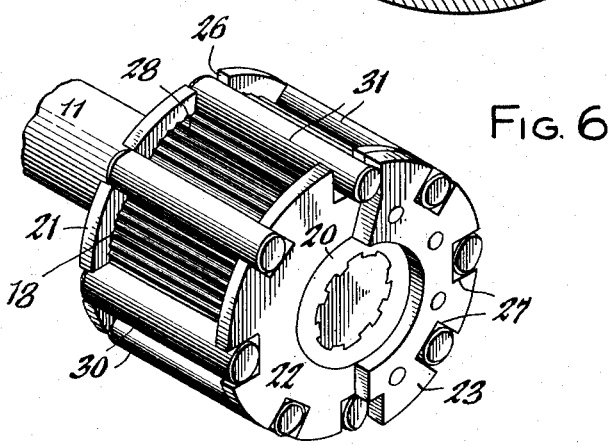
INVENTOR
Manley E. King
BY Walter P. Guyer
ATTORNEY

Patented May 19, 1953

2,638,795

UNITED STATES PATENT OFFICE 2,638,795

DIFFERENTIAL DRIVE MECHANISM

Manley E. King, Springville, N. Y.

Application February 6, 1951, Serial No. 209,655

4 Claims. (Cl. 74—650)

This invention relates to certain new and useful improvements in a differential drive mechanism for motor vehicles.

One of its objects is to provide an effective and reliable mechanism of this character which is simple, compact and inexpensive in construction, which is designed for application to the axles and housings of existing vehicles without altering their construction, and which insures the automatic selective engagement and release of the driving elements in accordance with the course of travel of the vehicle.

Another object of the invention is to provide a differential mechanism which is so designed as to employ a novel arrangement of clutching elements and interposed rollers for effecting a positive drive to the axles or a release of the clutching rollers in accordance with the direction of turning of the vehicle.

Other features of the invention reside in the construction and arrangement of parts hereinafter described and particularly pointed out in the appended claims.

Figure 1:
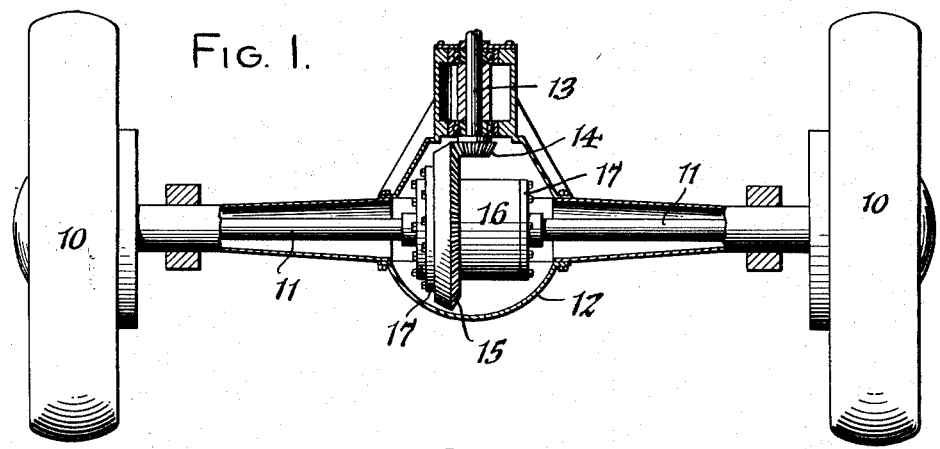
Figure 2:
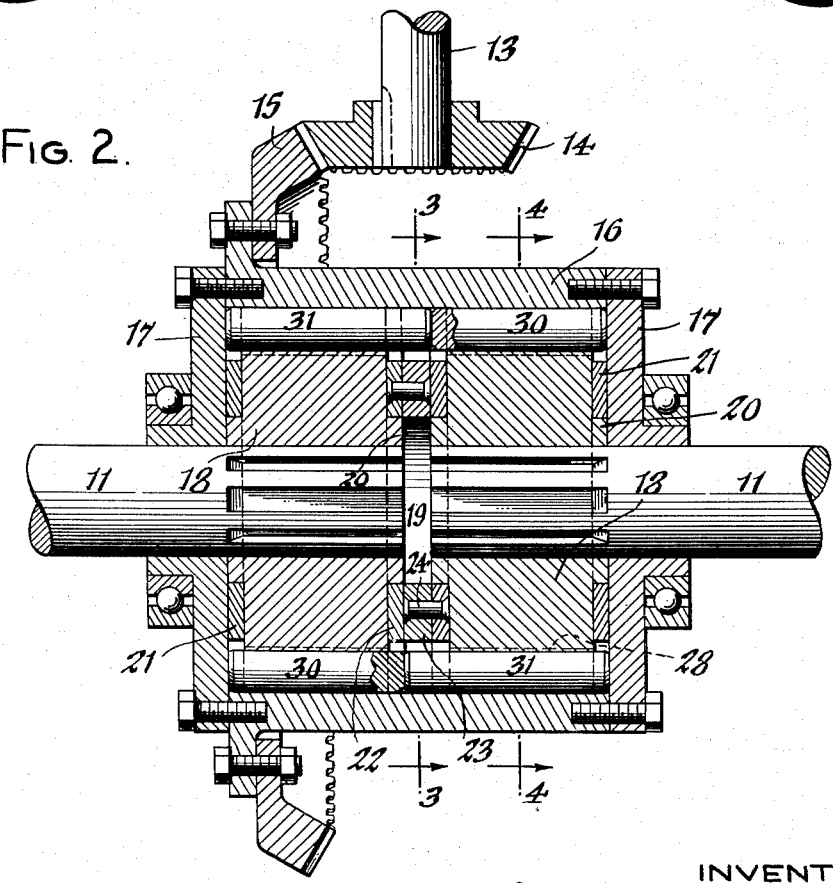

In the accompanying drawings:

Figure 1 is a sectional top plan view of the rear axle assembly of a motor vehicle showing my differential mechanism. Figure 2 is an enlarged longitudinal section thereof. Figures 3 and 4 are cross sections taken on the correspondingly numbered lines in Figure 2, the parts being shown in a neutral or non-engaging position. Figure 5 is a similar section with the parts in an engaged or driving position. Figure 6 is a perspective view of the differential assembly with one of the hub half-plates removed.

Similar characters of reference indicate corresponding parts throughout the several views.

By way of example, my invention has been shown in connection with the rear axle of a motor vehicle, 10 indicating the traction wheels, 11, 11 the companion alined axle-sections, 12 the housing therefor, and 13 the motor propeller shaft whose pinion 14 engages the ring gear 15 associated with the differential assembly.

The opposing inner ends of the axle-sections are enclosed within a sleeve-like drive casing 16 closed at its ends by cover plates 17 bolted or otherwise secured thereto. Attached to this drive sleeve casing is the ring gear 15, whereby motion is imparted to the casing and to the axles by the differential mechanism which is preferably constructed as follows:

Keyed on the opposing ends of the axle-sections 11, 11 to turn therewith are hub members 18, 18 concentrically spaced within the casing 16 and disposed side by side to provide a lateral or endwise space 19 therebetween. Each hub member is provided at its ends with bearing collars 20 and journaled on the outer collar between the outer face of the hub member and the companion casing-plate 17 is a roller-retaining ring 21 slightly less in diameter than that of the casing-bore and projecting somewhat beyond the periphery of such hub member, while the inner bearing collar has a similar roller-retaining ring 22 thereon. The opposing faces of these inner rings 22 are substantially flush with the ends of the axle-sections, as shown in Figure 2, and disposed within the space 19 therebetween is a two-part division member composed of semi-circular shaped segmental or hub half-plates 23, 23, one plate being secured by rivets 24 to the companion ring 22 of one of the hub members 18 and the other or mating half plate being similarly secured to the ring 22 of the companion hub member, providing for a limited relative turning movement of these companion assemblies. This limited turning movement is permitted by terminating the opposing diametrical edges of the half plates 23 short of each other to provide the resulting radially-disposed spaces 25.

In their outer edges the rings 21, 22 have a series of equi-spaced radial notches 26 therein and the companion segmental or half plates 23 have similar registering notches 27 therein, the notches in one of such plates constituting a continuation or extension of those in the adjoining half portion of the ring 22 associated with one of the hub assemblies and the notches in the companion plate constituting a continuation or extension of those in the adjoining half portion of the companion ring associated with the other hub assembly. The peripheral faces of the hub members 18 are longitudinally grooved or recessed, as indicated at 28, and the inner bore of the sleeve-like drive casing 16 has arcuate recesses 29 therein corresponding in number to the ring-notches 26 to provide cam-like faces in opposing relation to the hub-peripheries.

Operating in the concentric spaces between the hub members and the drive sleeve are two sets of forward and reverse clutching elements in the form of rollers 30, 31, associated with each hub member, which are supported at their ends for radial displacement in the companion ring-notches 26 when seeking a released or drive-engaging position. Those rollers 30 which comprise one-half of the rollers of each set are of a length to span the length of the companion hub member and its roller-retaining rings 21, 22 while those rollers 31 which comprise the other half of the rollers of each set are sufficiently longer to extend into the notches of the companion segmental hub plate 23, as seen in Figures 2 and 6. It will be noted in Figure 2 that the longer rollers 31 companion to one hub member 18 abut at their inner ends against the shorter rollers 30 of the other hub member, while the longer rollers 31 of the latter abut the shorter rollers in the first-named hub member. The outer ends of the rollers 30, 31 abut the inner faces of the casing cover-plates 17. In Figures 3 and 4 the rollers are shown as circumferentially displaced to their neutral or released positions, with the rollers seated at one side in the central portion of the casing-notches 29 and at their opposite sides on the high points of the hub-grooves 28. In Figure 5 the rollers are shown in their driving or clutched position, being seated at one side in the hub-grooves and in gripping or wedge-like contact at their opposite sides adjacent the converging or leading ends of the cam-forming grooves 29 in the drive sleeve casing 16 to compel a turning of the hubs and companion axle-sections 11 in the direction of rotation of such casing.

In operation, assuming the vehicle to be driven forwardly and straight ahead, the parts will assume the position shown in Figure 5, in which the rollers 30, 31 are seated in the hub-grooves 28 and wedged against one end of the drive casing cam-like recesses 29 to cause motion to be positively transmitted at the same speed to both wheels of the rear axle. Upon a right or a left turn, the differential mechanism functions to maintain the outer or faster traveling wheel in positive driving relation as depicted in Figure 6, while the inner or slower traveling wheel is unlocked or released from a drive or clutched position until the speeds of both wheels are equal, with the rollers 30, 31 shifted to a non-drive or neutral position shown in Figures 3 and 4, and with the inner hub member and axle being free to travel independently of the outer hub member and its axle. The diametrically-opposed radial spaces 25 between the complemental segmental plates 23 limit the relative movements of the hub members 18 to the required differential displacement to effect the release movement of the rollers from a driving to a neutral position and retain them in such position until the vehicle is again on a straight course, at which time the parts are automatically restored to a driving position.

I claim as my invention:

1. A differential mechanism, comprising a driven casing into which the opposing ends of alined axle-sections are adapted to extend, hub members applied to said axle-sections in endwise spaced relation and concentrically spaced within the casing, rings journaled on the opposite ends of said hub members and having equi-spaced roller-retaining notches therein, a division plate disposed in the endwise space between the hub members and including two substantially semi-circular segments having roller-engaging notches therein and each secured to a companion adjoining hub-ring for permitting a limited relative turning movement of the respective hub-rings, and rollers disposed between said hub members and said driven casing for releasably transmitting motion from the latter to the former and seated at their opposite ends in said ring-notches, certain of the rollers of each hub member being longer than the others and extending into registering relation with the notches of the companion division plate segment, the longer rollers of one hub member being alined with and in endwise abutting engagement with the shorter rollers of the other hub member and the outer ends of the respective rollers abutting the inner end walls of said driven casing.

2. A differential mechanism, comprising a driven casing into which the opposing ends of alined axle-sections are adapted to extend, hub members applied to said axle-sections in endwise spaced relation and concentrically spaced within the casing, rings journaled on the opposite ends of said hub members and having equi-spaced roller-retaining notches therein, a division plate disposed in the endwise space between the hub members and composed of two substantially semi-circular segments having equi-spaced, roller-engaging notches therein, one of the segments being secured to the inner ring companion to one of the hub members and the other segment being secured to the inner ring companion to the other hub member with radial spaces provided between the opposing ends of such segments, and two sets of long and short rollers disposed between each hub member and said driven casing for releasably transmitting motion from the latter to the former and seated in said ring-notches, the longer set of rollers extending into the notches of the companion ring-segment and being alined with and in endwise abutting relation to the short rollers associated with the other hub member.

3. In a differential drive mechanism, a hub assembly for each axle-section comprising a hub member having roller-receiving grooves in the surface thereof, rings journaled on the opposite ends of said hub member and having radially-disposed, roller-retaining notches in the periphery thereof, a segmental plate of substantially semi-circular shape applied to one of said hub-rings and having notches therein in register with the adjoining notches in such hub-ring, and long and short rollers disposed about the hub member and seated at their ends in said ring-notches, the long rollers being disposed about the segmental plate portion of the hub ring and extending into registering relation with the notches in such plate, the segmental plate being somewhat less than a true semi-circle to define, with the complemental plate of the companion hub assembly, diametrically disposed radial spaces therebetween.

4. A differential mechanism, comprising a driven casing into which the opposing ends of alined axle-sections are adapted to extend, hub members applied to said axle-sections in endwise spaced relation and concentrically spaced within the casing, rings journaled on the opposite ends of said hub members and having equi-spaced roller-retaining notches therein, a division plate disposed in the endwise space between the hub members and composed of two substantially semi-circular segments having equi-spaced, roller-engaging notches therein, one of the segments being secured to the inner ring companion to one of the hub members and the other segment being secured to the inner ring companion to the other hub member with radial spaces provided between the opposing ends of such segments, and two sets of long and short rollers disposed between each hub member and said driven casing for releasably transmitting motion from the latter to the former and seated in said ring-notches, the longer set of rollers extending into the notches of the companion ring-segment and being alined with and in endwise abutting relation to the short rollers associated with the other hub member, the hub members having roller-receiving grooves therein and the surrounding inner wall of the driven casing having roller-engaging recesses therein in registering relation to said ring-notches.

MANLEY E. KING.

References Cited in the file of this patent
UNITED STATES PATENTS

| Number | Name | Date |
| --- | --- | --- |
| 1,179,667 | Sherman | Apr. 18, 1916 |
| 1,852,974 | King | Apr. 5, 1932 |
| 1,869,154 | King | July 26, 1932 |